United States Patent
Forsline et al.

(10) Patent No.: US 6,801,211 B2
(45) Date of Patent: Oct. 5, 2004

(54) COMPUTER PAINTING SYSTEM WITH PASSIVE PAINT BRUSH STYLUS

(76) Inventors: Ladd B. Forsline, 16 Gehringer Dr., Kutztown, PA (US) 19530; Bradley D. Pedersen, 6800 Indian Hills Rd., Edina, MN (US) 55439

( * ) Notice: Subject to any disclaimer, the term of this patent is extended or adjusted under 35 U.S.C. 154(b) by 64 days.

(21) Appl. No.: 10/027,247

(22) Filed: Dec. 21, 2001

(65) Prior Publication Data

US 2003/0117408 A1 Jun. 26, 2003

(51) Int. Cl.$^7$ ................................................ G09G 5/00
(52) U.S. Cl. .................................... 345/581; 345/179
(58) Field of Search ............................... 345/581–589, 345/901, 179; 178/18.01

(56) References Cited

U.S. PATENT DOCUMENTS

| | | | |
|---|---|---|---|
| 4,524,421 A | | 6/1985 | Searby et al. |
| 4,829,455 A | * | 5/1989 | Long et al. ................. 345/632 |
| 5,155,813 A | | 10/1992 | Donoghue et al. |
| 5,329,070 A | | 7/1994 | Knowles |
| 5,343,220 A | | 8/1994 | Veasy et al. |
| 5,420,607 A | | 5/1995 | Miller et al. |
| 5,434,959 A | | 7/1995 | Von Her, II et al. |
| 5,488,204 A | | 1/1996 | Mead et al. |
| 5,528,266 A | | 6/1996 | Arbeitman et al. |
| 5,557,301 A | | 9/1996 | D'Aviau de Piolant |
| 5,581,052 A | * | 12/1996 | Padula et al. ............. 178/19.04 |
| 5,630,038 A | * | 5/1997 | Itoh et al. ................... 345/594 |
| 5,635,682 A | * | 6/1997 | Cherdak et al. ......... 178/19.01 |
| 5,635,683 A | | 6/1997 | McDermott et al. |
| 5,646,650 A | | 7/1997 | Miller et al. |
| 5,861,878 A | | 1/1999 | Lee |
| 5,959,616 A | | 9/1999 | Challener |
| 5,977,958 A | | 11/1999 | Baron et al. |
| 5,990,875 A | | 11/1999 | Bi et al. |
| 6,193,152 B1 | * | 2/2001 | Fernando et al. ............ 235/380 |
| RE38,286 E | * | 10/2003 | Flowers .................... 178/18.01 |
| 2002/0046249 A1 | * | 4/2002 | Shiigi ......................... 709/206 |
| 2002/0050983 A1 | * | 5/2002 | Liu et al. ..................... 345/173 |
| 2002/0118209 A1 | * | 8/2002 | Hylen ......................... 345/582 |

* cited by examiner

Primary Examiner—Matthew C. Bella
Assistant Examiner—Anthony J Blackman
(74) Attorney, Agent, or Firm—Patterson, Thuente Skaar & Christensen, P.A.

(57) ABSTRACT

A computer painting system is provided for a graphic computer system that has at least one touch screen apparatus and at least one display. A stylus having a tip formed of a solid piece of a resiliently compliant non-conductive material is used to apply variable pressure on the surface of the touch screen apparatus. Software executing on the computer system interprets the variable pressure applied to the surface of the touch screen apparatus and generates corresponding graphic images on the display. Preferably, the tip of the stylus is formed of a silicone material that allows the tip to easily move across the touch screen apparatus in a way that simulates a conventional painting brush stroke but without leaving a buildup of material on the touch screen apparatus. In one embodiment, the touch screen apparatus and the display are incorporated together in the same device. In another embodiment, the touch screen apparatus is a palette physically separate from the display and operably connected to the computer system.

9 Claims, 4 Drawing Sheets

COMPUTER PAINTING SYSTEM WITH PASSIVE PAINT BRUSH STYLUS

FIELD OF THE INVENTION

The present invention relates generally to the field of graphic computer input devices. More specifically, the present invention relates to a passive paint brush stylus formed of a solid piece of a resiliently compliant non-conductive material that interacts with a touch screen display of a computer painting system to provide a computer input system that more closely replicates the actions of conventional painting.

BACKGROUND OF THE INVENTION

The most popular input devices for computers are the keyboard and mouse. In the field of graphic computer input devices, however, the use of alternative input devices is well known. There are numerous systems that use a passive stylus or pen in connection with a touch screen or digitizing pad. These types of input systems are particularly popular as a way of recognizing handwriting input. A recent example of these types of input systems can be found in U.S. Pat. No. 5,990,875. The passive stylus for these types of input systems is a rigid pen-like device with a somewhat rounded point at the tip of the stylus. This is because the goal of these input systems is to accurately digitize and discriminate the particular spot being indicated by the tip of the stylus and to allow for easy movement of the stylus across the screen or input pad without the stylus being so sharp as to damage the screen or input pad. In one of the more popular applications as an input device for recognizing handwriting for a personal digital assistants (PDAs), it is also important that the stylus be relatively inexpensive so that it can be easily replaced if lost.

While this type of rigid passive stylus is well suited for point recognition applications such as handwriting recognition, it is not well suited to replicating the techniques of conventional painting. In a conventional painting process, the bristles in the tip of a paint brush carry the paint across a surface and create various marks depending upon the size of the brush, the pressure and speed with which the brush is moved across the surface and the angular orientation of the brush relative to the surface. Alternative paint tools such as spatulas or palette knives carry the paint on a surface of the flat tip of the tool that is then spread across the surface in a manner similar to a bristle paint brush; however, the marks made by a spatula or knife on the surface are generally distinct from those created by a conventional bristle paint brush. A silicone paint brush tool that can more closely replicate the manner and strokes as applied by a conventional bristle paint brush is described in U.S. Pat. No. 5,542,144. In contrast to the point oriented nature of a rigid passive stylus, each of these painting tools distributes paint on the surface being painted in a spreading fashion that results in variable width, thickness and density of paint being applied to the surface. As a result, it is difficult to replicate the performance of such painting tools in the context of a graphic computer input device using a rigid passive stylus.

A number of systems have been developed that utilize an active stylus as part of a graphic computer input system in an effort to more closely replicate the results of conventional painting techniques. In contrast to the passive stylus, an active stylus has some electronic or optical components in the stylus that interact with the computer and input screen as part of the graphic input system. For example, U.S. Pat. Nos. 5,420,607 and 5,646,650 describe an electronic paintbrush and color palette that allow a user to generate images on a CRT screen in a manner that imitates conventional painting by using an electronic stylus with fiber optic bristles embedded in the tip of the stylus. A microprocessor in the stylus scans the CRT screen to determine position, angular orientation and pressure of the stylus relative to the screen and communicates this information to the computer controlling the CRT screen to control the generation of images on the screen. Other examples of input systems that use an active or intelligent stylus coupled to a computer are described in U.S. Pat. Nos. 5,155,813, 5,343,220, 5,528,266, 5,557,301, 5,581,052, 5,635,683, 5,959,616 and 5,977,958. Examples of a pressure-sensitive stylus or pen connected to a computerized graphic system that mixes or combines certain predetermined colors, such as the primary colors, on an electronic palette arrangement are described in U.S. Pat. Nos. 4,524,421 and 5,343,220. U.S. Pat. No. 5,861,878 describes a graphic input system that utilizes a mouse input, but represents a graphically modeled painting brush with elastic bristles on the display screen. The obvious problem with such active stylus systems is that the stylus must be relatively complicated and must be coupled in some manner to the computer and display screen. This complexity increases the cost of the system and can interfere with the ability of the system to emulate conventional painting techniques.

A few patents have attempted to use a passive stylus in a manner that imitates conventional painting techniques, rather than as a point entry device for handwriting recognition or the like. U.S. Pat. No. 5,434,959 describes a system for generating variable width lines in which the pressure exerted by a rigid passive stylus or pen on a pressure sensitive tablet and, specifically, for addressing the problem of how to maintain the width of a line as the pen is removed from the tablet. U.S. Pat. No. 5,488,204 describes a paint brush stylus for a capacitive touch sensor pad. The paint brush stylus is comprised of conductive fibers held together at the tip of the stylus like a conventional paint brush. This patent teaches that neither resistive nor acoustic wave touch screens are suitable for simulating conventional painting techniques. Instead, the conductive fibers of the paint brush stylus interact with a capacitive touch-sensor pad to simulate paint-like strokes on a display associated with the capacitive touch-sensor pad.

Despite the various attempts to replicate the process of conventional painting techniques for a computer graphic input system, a simple, economical and accurate representation of conventional painting techniques has yet to be developed for a computer graphic input system.

SUMMARY OF THE INVENTION

The present invention is a computer painting system in which a graphic computer system has at least one touch screen apparatus and at least one display. A stylus having a tip formed of a solid piece of a resiliently compliant non-conductive material is used to apply variable pressure on the surface of the touch screen apparatus. Software executing on the computer system interprets the variable pressure made on the touch screen apparatus and generates corresponding graphic images on the display. Preferably, the tip of the stylus is formed of a silicone material that allows the tip to easily move across the touch screen apparatus in a way that simulates a conventional painting brush stroke but without leaving a buildup of material on the touch screen apparatus. In one embodiment, the touch screen apparatus and the display are incorporated together in the same device. In another embodiment, the touch screen apparatus is a palette physically separate from the display and operably connected to the computer system. Preferably, the touch screen apparatus is a surface acoustic wave touch screen device.

In a preferred embodiment, the palette is provided with a spectral color wheel and a plurality of selected color pads and mixed color pads representing available colors to be applied, as well as buttons for controlling applied color attributes such as color consistency, texture, mixing, loading, translucence and blendability. In another embodiment, a scanner is utilized to generate input color data for the palette. Multiple different renditions of the palette may be cataloged and saved for subsequent use to allow a user to build up a repertoire of specifically chosen palettes.

DETAILED DESCRIPTION OF THE PREFERRED EMBODIMENT

Figure 1:
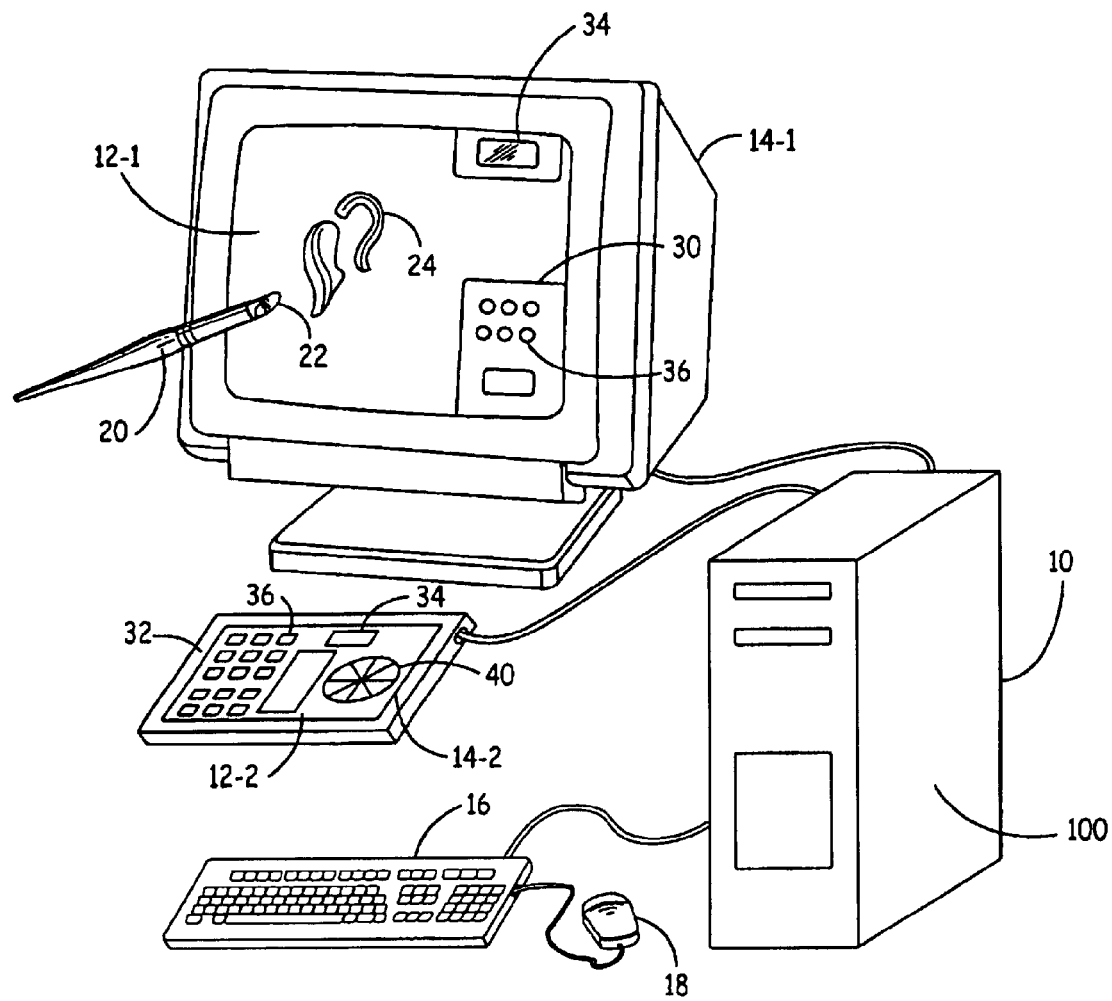
FIG. 1 is a schematic representation of the computer painting system in accordance with the present invention.

Referring now to FIG. 1, an overall description of the preferred embodiment of the present invention will now be described. A graphic computer system 10 has at least one touch screen apparatus 12-1, 12-2 and at least one display 14. The graphic computer system 10 can be any stand-alone or networked computer system. Preferably, the graphic computer system is a desktop or workstation computer having a keyboard 16 and mouse 18 and sufficient computer processing capability for running a graphic image processing program in real time. The touch screen apparatus 12-1, 12-2 is preferably of the type as described in U.S. Pat. No. 5,329,070 or a similar surface acoustic wave touch screen apparatus. One such apparatus is the IntelliTouch® touch screen available from Elo TouchSystems, Fremont, Calif. Alternatively, the touch screen apparatus 12 may be a resistive type touch screen apparatus or any other similar touch screen pressure sensitive input device which does not require conductivity to establish the pressure being applied to the apparatus.

A stylus 20 having a tip 22 formed of a solid piece of a resiliently compliant non-conductive material is used to apply variable pressure on the surface on the touch screen apparatus 12. Software 100 executing on the computer system 10 interprets the variable pressure on the touch screen apparatus 12 and generates corresponding graphic images 24 on the display 14. Preferably, the tip 22 of the stylus 20 is formed of a silicone material that allows the tip 22 to easily move across the touch screen apparatus 12 in a way that simulates a conventional painting brush stroke but without leaving a buildup of material on the touch screen apparatus 12. The resiliently compliant nature of the material of the tip 22 creates a pressure pattern on the touch screen apparatus 12 that can range from a single point to a broad path having different pressure gradients across the breadth of the path by, for example, altering the relative pressure on each side of the stylus or by changing the angle of the tip 12 to the surface of the touch screen apparatus. As the tip 22 is moved across the surface of the touch screen apparatus 12, a user may also vary the pressure on the tip 22 or may rotate the tip 22 to create different pressure patterns along the length of a given brush stroke.

In one embodiment, the touch screen apparatus 12 and the display 14 are incorporated in the same device. In this embodiment, a palette 30 is defined in a portion of the combined touch screen apparatus 12 and display 14. In another embodiment, the touch screen apparatus 12-2 operates as a palette 32 physically separate from the display 14 and operably connected to the computer system 12. In this embodiment, the touch screen apparatus 12-2 may have a corresponding display 14-2 for displaying the particular color that will be applied to the graphic images 24 as part of the palette 32. Alternatively, the presently active color may be displayed on display 14-2 of palette 32 or by portion 34 of the display 14.

Figure 4:
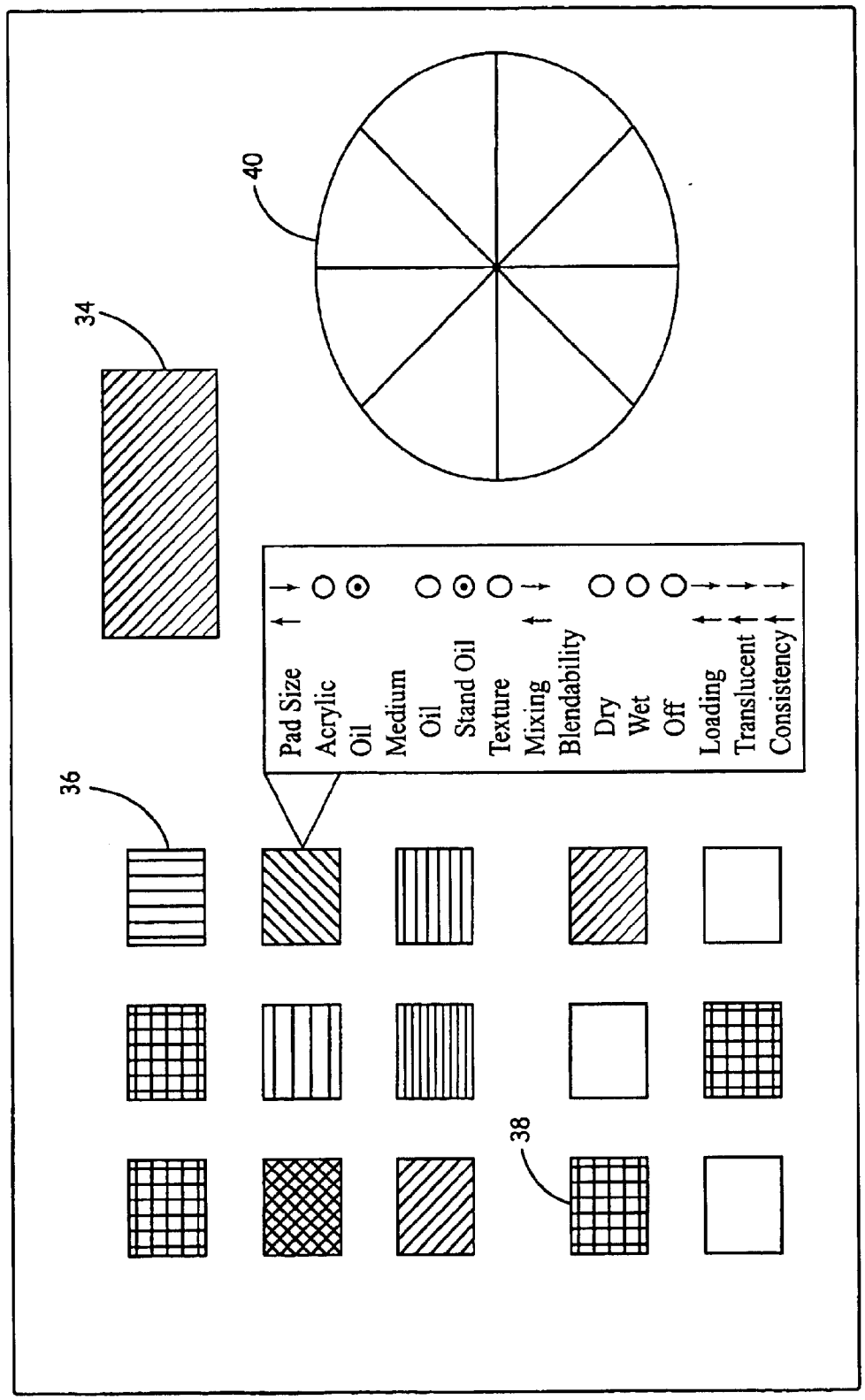
FIG. 4 is a representation of a sample screen shot of a preferred embodiment of a palette in accordance with the present invention.

In a preferred embodiment, the operation of the palettes 30, 32 is designed to emulate the manner by which conventional paint is mixed on a palette and the stylus 20 is preferably used as the mechanism by which a user selects and then mixes colors in the display 14-2 of the palette 32. As shown in FIG. 4, a preferred embodiment of the palettes 30, 32, a plurality of selected color pads 36 are chosen by having a user touch a desired location on a spectral color wheel 40 and then touch a selected color pad 36 to "fill" that color pad 36 with the indicated color. It will be understood that any number of known "color wheel" systems could be utilized and that in addition to graphically selecting a color, a user could also be provided with numeric or slider bar controls to alter hue, saturation, luminosity and RGB values of a selected color. Preferably, the spectral color wheel 40 is specified by the system. Alternatively, data for generating a number of spectral color wheels 40 could be supplied on a removable media and loaded into the system, or chosen by a user in a setup mode. It is anticipated that any number of color wheels 40 could be stored and chosen by a user. In addition, pre-selected color pads 36 and even mixed color pads 38 could also be stored by a user or provided on removable media to be loaded into the system.

Once the user has a desired number of color pads 36 selected, the user may mix two or more of the selected color pads 36 together in one or more mixed color pads 38 by touching a selected color pad 36 and then touching a desired mixed color pad 38. The number of color pads 36 and mixed color pads 38 on a palette can be fixed or could be selected as a parameter by the user. In addition, the arrangement of color pads 36 and mixed color pads 38 can be arranged as two concentric circles of pads in a manner similar to the arrangement of paint depressions in a conventional palette.

The amount of "paint" transferred to the mixed color pad 38 can be a function of the amount of time and/or pressure that the stylus 20 engages with either or both of the pads 36, 38. Applied color attributes such as color consistency, texture, mixing, loading, translucence, and blendability can be assigned to the active color 34, or to any or all of the selected color pads 36 and mixed color pads 38. As shown in FIG. 4, a pop-up or sized window with control buttons is used to allow the user to enlarge a given pad and control the applied color attributes. Slider bars on the palette 32 may also be used to control the mixing and loading of the colors to be utilized in creating the graphic images 24 corresponding to the brush strokes made by stylus 20.

Preferably, applied color attributes are controlled by an intuitive user interface that emulates the selection and mixing of conventional artist's paints. The choices from this interface are then added into the algorithms by which the graphical display software will generate images on the display 14. For example, color consistency is controlled by designating a color base (i.e., acrylic or oil) for the selected pad 34, 36, 38, and then controlling the amount of medium (e.g., oil, stand oil, water), if any, to be added. Color texture may be controlled by adding texture materials (e.g., sand) or by selecting a desired solid mixing (e.g., lumpy, smooth). Alternatively, color texture may be coordinated with the operation of a selected tip marking pattern to generate particular marks. The degree of mixing of selected colors 36 to form mixed colors 38 may be controlled, for example, by the amount of circular action of the stylus 12 on the mixed color pad 38. Alternatively, the degree of mixing of selected colors 36 to form mixed colors 38 may be controlled by a slider bar alongside the mixed color pad 38. In one embodiment, the active color 12 can be selectively loaded with two or more selected colors 36 or mixed colors 38. To accomplish this, the active color 12 can be partitioned into multiple segments, each segment being loaded by having a user touch a selected color 36 or mixed color 38 and then touch one of the multiple segments to load that color into the active color 12. The translucence and hue of the selected colors 36, mixed colors 38 or active color 12 can be determined by adding colors (e.g., white) or mediums to the color. Alternatively, slider bar controls may be used to selectively control the quality of these color attributes.

The blendability of a selected color 36, mixed color 38 or active color 12 refers to the degree to which this color will be blended with other mixed colors or existing colors in a region of the display 14 when that color is applied. Blendability can be thought of as the ability to selectively control the drying speed of the color. In one embodiment, blendability may be set to off, dry or wet. In another embodiment, blendability may be controlled by designating the drying time of the color, which can be either user selected for which can be automatically generated based on the other attributes such as base paint type and addition of mediums or texture material. In another embodiment, a scanner may be utilized to generate input color data for the selected colors 36. Multiple different renditions of palettes 32 may be cataloged and saved in the computer system 10 for subsequent use to allow a user to build up a repertoire of specifically chosen palettes 32.

Figure 2:
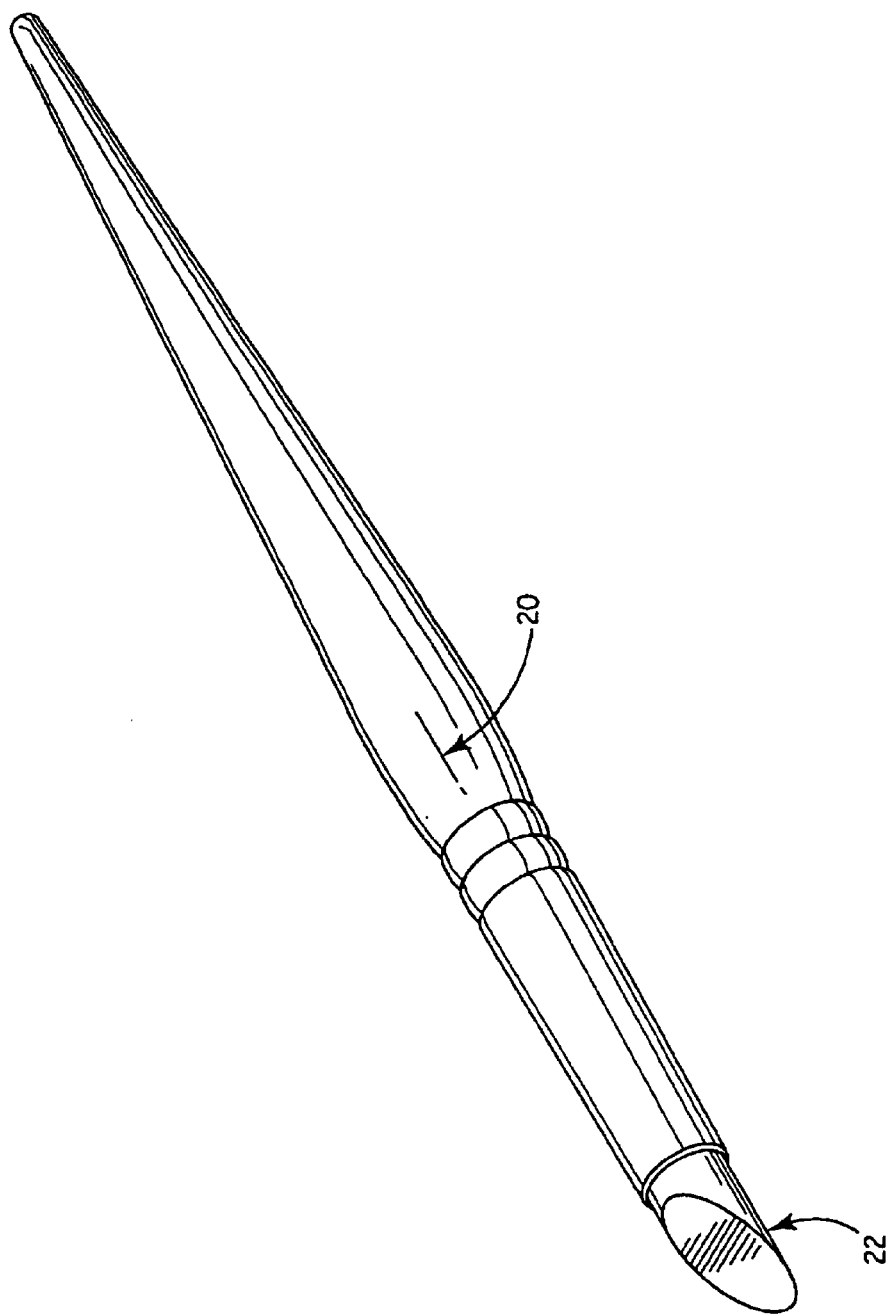
FIG. 2 is an isometric view of a preferred embodiment of the passive paint brush stylus of the present invention.

A preferred embodiment of the passive paint brush stylus 20 in accordance with the present invention is shown in FIG. 2. The details of construction of such a stylus 20 are described in U.S. Pat. No. 5,542,144, the disclosure of which is hereby incorporated by reference. One such apparatus is the Colour Shaper® paint tool available from Royal Sovereign, London, England. Preferably, the touch screen apparatus 12 has a glass or similar smooth surface, and the coefficient of friction of the tip 22 moving across this surface is slow enough to allow the tip 22 to move across the surface in a smooth and continuous manner without skipping or grabbing. Alternatively, other resiliently compliant solid materials instead of silicone could be utilized for the tip 22, such as flexible thermoplastics and rubbers. Preferably, such alternate materials will be non-absorbent and will not leave residue on the surface of the touch screen apparatus 12 as they are moved across the surface.

Different contours of the working surface of tip 22 will create different pressure patterns on the touch screen apparatus 12, thereby allowing for the creation of graphic images corresponding to the unique patterns of different tips 22. The manner in which the pressure patterns are translated into graphic images can either be fixedly defined in the software 100, or can be selectable by a user with a pull down menu or with a separate setup routine in which a brush stroke is made by the user and a desired graphic pattern is then selected to correspond to that brush stroke.

Figure 3:
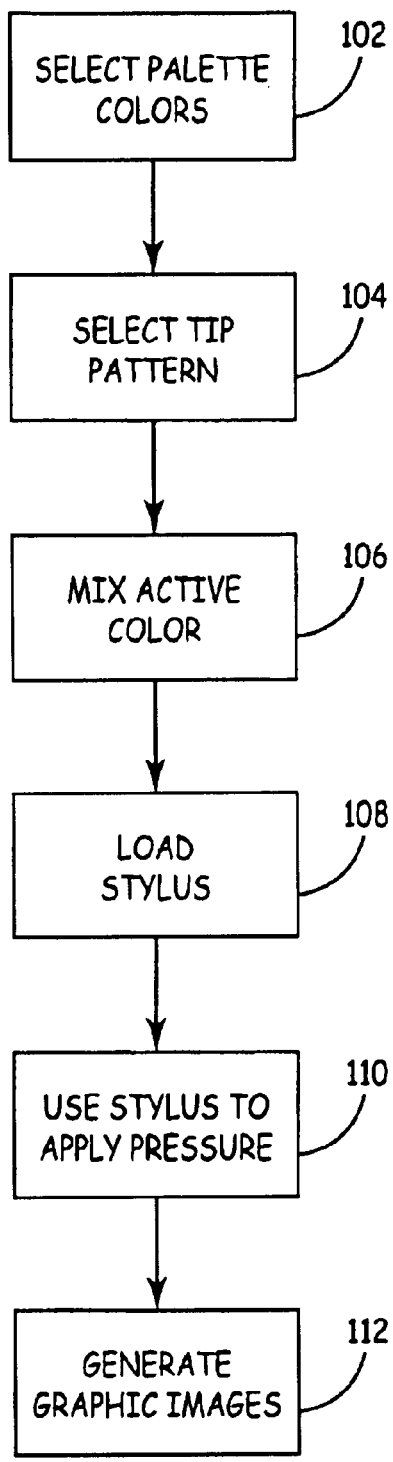
FIG. 3 is a block diagram of a preferred embodiment of the interpretative software routine executing on the present invention.

Referring now to FIG. 3, a preferred embodiment of the overall flow of the software 100 will now be described. At step 102, the user selects the colors 36 that will be displayed on the palette 34, preferably in the manner as described with reference to FIG. 4. At step 104, a user may optionally select a particular tip marking pattern characteristic for the stylus 20. At step 106, an active color 34 is displayed in the display 14-2 of palette 32. In step 106, the software 100 preferably interprets the pressure patterns on the display portion 14-2 of touch screen apparatus 12-2 to control the algorithm by which the selected colors 36 are mixed, preferably in the manner as described with reference to FIG. 4. It is also possible for the display 14-2 to generate a color pattern that is not uniformly mixed such that the active color will vary as it is applied to the graphic images 24 on the display 14-1. Once an active color 34 is mixed at step 106, the stylus 20 is "loaded" with the paint represented by that active color at step 108. Preferably, the pressure pattern of the stylus 20 on the palette 32 determines the virtual amount of paint that the stylus will carry when applying pressure to the display 14-1. The software 100 can program the selected amount of paint into the algorithm for generating the graphic images corresponding to the pressure pattern created by the stylus 20 on the display 14-1. Alternatively, a user may indicate that the stylus 20 is to be loaded with an unlimited amount of paint such that painting with the active color can be continuous. At step 110, the user applies pressure to the display 14-1 using the stylus 20. The software at step 112 interprets the pressure patterns detected on the touch screen apparatus 12-1 and generates corresponding graphic images 24 in response based on the active color and its associated color attributes of, the loading of the stylus, the pressure pattern and the existing graphic images at the location where stylus 20 is applying pressure to display 14-1. All or parts of this process are then repeated as a user develops a complete picture on the display 14-1. If, for example, the user desires to continue painting with the current active color 34 and the stylus 20 has not been set for loading unlimited paint quantities, then the user would return the stylus 20 to the palette 32 to reload the stylus with a new virtual quantity of the active color 34 at step 108. If, on the other hand, the user wants to alter the active color 34 or mix a new active color, then the user would return to step 106. To change the setup of the palette 32 or the stylus 20, the user would return to steps 102 or 104, respectively.

It will be appreciated that there are numerous ways in which the algorithms to generate the graphic images 24 can be programmed. For example, it is possible to use the algorithms in step 110 to vary the hue, intensity, saturation, or drying time of the active color, or any combination thereof. It is also possible to vary the opaqueness of the active color as applied, to vary the density of the active color as a function of the amount of virtual paint that has been loaded on the stylus 20, or to calculate the resulting color from combining an existing color at a location where the stylus 20 is applied with the active color being carried by the stylus. The particular details of how these features are implemented in the software for step 110 will depend upon the nature of the way in which colors are represented in the graphic image processing computer, the programming language being used and the particular characteristics of the display 14.

What is claimed:

1. A computer painting system comprising:

a graphic computer system having at least one touch screen apparatus and at least one display;

a passive stylus having a tip formed of a solid piece of a resiliently compliant, non-conductive flexible polymer material, the polymer material of the tip being sufficiently resiliently compliant and flexible to create a variable pressure pattern when applied to the touch screen apparatus that ranges from a signal point to a broad path; and software executing on the computer system to interpret the variable pressure pattern applied to the touch screen apparatus by the stylus and generate corresponding graphic images on the display without utilizing any interaction from the stylus other than the variable pressure pattern applied to the touch screen apparatus by the passive stylus.

2. The computer painting system of claim 1 wherein the tip of the stylus is formed of a silicone material.

3. The computer painting system of claim 1 wherein the touch screen apparatus and the display are incorporated together in the same device.

4. The computer painting system of claim 1 wherein the touch screen apparatus is a palette physically separate from the display and operably connected to the computer system.

5. The computer painting system of claim 1 wherein the touch screen apparatus is a surface acoustic wave touch screen device.

6. A method of implementing a computer painting system in a graphic computer system having at least one touch screen apparatus and at least one display, the method comprising:

using a passive stylus have a tip formed of a solid piece of a resiliently compliant non-conductive flexible polymer material to assert a variable pressure pattern on the touch screen apparatus that ranges from a single point to a broad path in a manner similar to brush strokes of conventional painting techniques; and executing software on the computer system to interpret the variable pressure pattern applied to the touch screen apparatus byte stylus and generate corresponding graphic images on the display without utilizing any interaction from the stylus other than the variable pressure pattern applied to the touch screen apparatus by the passive stylus.

7. The method of claim 6 further comprising using the stylus to mix a plurality of preselected colors on a portion of at least one of the touch screen apparatus to define an active color.

8. The method of claim 6 further comprising loading the stylus with a virtual quantity of an active color of paint which the software on the computer system uses to generate the graphic images on the display.

9. The method of claim 6 further comprising selecting a pattern that the stylus will create when the software on the computer system generates the graphic images on the display.

\* \* \* \* \*